(12) United States Patent  (10) Patent No.: US 8,582,576 B2
Wu et al.  (45) Date of Patent: Nov. 12, 2013

(54) METHOD OF BUS CONFIGURATION TO ENABLE DEVICE BRIDGING OVER DISSIMILAR BUSES

(75) Inventors: Zong Liang Wu, San Diego, CA (US); Ronald B. Lee, San Diego, CA (US); Yusuf Ozturk, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 138 days.

(21) Appl. No.: 13/076,743

(22) Filed: Mar. 31, 2011

(65) Prior Publication Data

US 2011/0176549 A1 Jul. 21, 2011

Related U.S. Application Data

(62) Division of application No. 12/206,465, filed on Sep. 8, 2008, now Pat. No. 7,933,281, which is a division of application No. 10/789,059, filed on Feb. 27, 2004, now Pat. No. 7,428,222.

(60) Provisional application No. 60/450,966, filed on Feb. 28, 2003.

(51) Int. Cl.
*H04L 12/28* (2006.01)

(52) U.S. Cl.
USPC .............................. 370/392; 370/401; 370/257

(58) Field of Classification Search
None
See application file for complete search history.

(56) References Cited

U.S. PATENT DOCUMENTS

| | | | |
|---|---|---|---|
| 7,428,222 B1 * | 9/2008 | Wu et al. | 370/257 |
| 7,933,281 B2 * | 4/2011 | Wu et al. | 370/401 |
| 2011/0176549 A1 * | 7/2011 | Wu et al. | 370/392 |

OTHER PUBLICATIONS

IEEE Standard for a High-Performance Serial Bus, IEEE Std 1394-2008, IEEE Computer Society Sponsored by the Microprocessor Standards Committee, Redline, dated Oct. 21, 2008, pp. 1-192.

* cited by examiner

*Primary Examiner* — Robert Wilson
(74) *Attorney, Agent, or Firm* — Bruce Greenhaus; Sheppard Mullin Richter & Hampton LLP

(57) ABSTRACT

Several local IEEE1394 buses are bridged together over a second bus type to create a global bus wherein each local bus node is able to address nodes across the global bus without the local nodes being aware of the bridging operation. A bridging device operates by translating local bus node addresses to a global bus for communication over the second bus type. Alternatively, the local bus node identification process is controlled by the bridging device operating as the root node to cause the local nodes to be identified with a node address that is unique for the global network. The second bus type operates as a backbone for the global network and can be any type of communication bus or network with capability to transport the local bus traffic. The bridging devices that interface the local IEEE1394 buses to the backbone contain portals specific to each bus type that can communicate data between the dissimilar buses.

27 Claims, 3 Drawing Sheets

METHOD OF BUS CONFIGURATION TO ENABLE DEVICE BRIDGING OVER DISSIMILAR BUSES

RELATED APPLICATIONS

This application is a divisional application of U.S. patent application Ser. No. 12/206,465, filed Sep. 8, 2008, now U.S. Pat. No. 7,933,281, which is a divisional application of U.S. patent application Ser. No. 10/789,059 filed Feb. 27, 2004, now U.S. Pat. No. 7,428,222, which claims priority to U.S. provisional application No. 60/450,966 filed Feb. 28, 2003 entitled "Communication bridge between incompatible networks", all of which are incorporated herein by reference in their entireties.

BACKGROUND

1. Field

The present disclosure relates to digital buses and more specifically to bridging data from one bus type to another bus type.

2. Background

The Institute of Electrical and Electronics Engineers (IEEE) is an international non-profit, professional organization for the advancement of technology related to electricity. Among the functions of the IEEE, the IEEE generates industry standards. The IEEE 1394 interface is a serial bus interface standard for high-speed communications and isochronous real-time data transfer frequently used in a personal computer and digital audio and digital video. The interface is also known by the brand names of FireWire (Apple Inc.), i.LINK (Sony), and Lynx (Texas Instruments). Though not as widely used, the 1394 standard also defines a backplane interface.

Typically, the IEEE1394 bus is used without any connection to or association with any other bus or network. In such situations, the IEEE1394 bus configuration process typically consists of three steps: (1) bus initialization, (2) tree identify, and (3) self identify. (refer to IEEE Std 1394-1995, pages 307-319).

Bus initialize: A bus reset is generated whenever there is a topology change, for example when a node is connected into or disconnected from the bus. Each port keeps the connection status and checks the change of the status.

Tree identify: After the bus initialize, the tree identify process translates the general network topology into a tree, where one node is designated as a root and all of the physical connections have a direction associated with them pointing towards the root. Each port can notify its directly connected port as its probable parent. If two neighboring ports notify each other at the same time, a random back off is used to resolve the competition. The port which waits the longest after the bus reset to start participating in the tree identify process becomes the root of the bus. This provides a way for the user to choose one particular node as the root node.

Self identify: The self identify process uses a deterministic selection process to let each node on the bus to identify itself by generating and sending a packet containing its physical ID. The physical ID is simply the count of the number of times a node passes through the state of receiving self-ID packets from other nodes before having its own opportunity to do so. The root node passes control of the bus to the node attached to its lowest numbered connected port and waits for that node to signal that it and all of its children nodes have identified themselves. The root then passes control to its next highest port and waits for that node to finish. When the nodes attached to all the ports of the root are finished, the root itself does a self identify. The children nodes uses the same process in a recursive manner. The IEEE1394 is an all-pass bus where each node sees the self-ID packet of every other node.

After the root has sent its self-ID packet, every node can build up the bus topology based on the self-ID packets observed. Each node is aware of the existence of all the other nodes on the bus. There can be up to 63 nodes on a bus. If a new node is connected to the bus or an existing node is disconnected, the above bus configuration process will be triggered, so that each node has an updated view of the bus topology.

When an IEEE 1394 bus is used in a multi-bus network, a bridge is required between the networks. A standard that is currently known as IEEE P1394.1 is being developed to bridge multiple IEEE1394 buses, each of which can have up to 63 nodes. In accordance with IEEE P1394.1, up to 1023 IEEE1394 buses can be bridged together. In P1394.1, each bus is an autonomous bus, with a unique bus ID. There are many desirable properties with this approach, such as:

Enabling a larger network, with Up to 1023 buses or 64K nodes

Each bus can be more efficient

Isolates local traffic, resulting in more usable bandwidth in the network

Isolates bus reset, resulting in a more stable network

Isolates local events from the rest of the network

Isolates medium-specific behaviors

Provides an open framework for bridging clusters of different medium and protocols However, P1394.1 bridges work correctly only with bridge-aware devices. A bridge-aware device has the following properties:

Aware that there may be more than a local bus in the network

Knows the difference between local node IDs and global IDs

Can discover remote devices (e.g., using DEP (Discovery and Enumeration Protocol))

Can determine and deal with remote timeouts

Can detect bridge portals on the local bus

Implements bridge-aware bit in Configuration ROM

Implements special registers:
  QUARANTINE
  MESSAGE_REQUEST, MESSAGE_RESPONSE

Understands new primary packet fields (e.g., proxy_ID)

This and other constraints (refer to chapter 9 of 1394.1 spec, Draft 1.04) mean that almost all current 1394 devices are non-compliant to the 1394.1 chapter 9, and thus cannot work as specified by P1394.1. In fact, these devices can even not detect the connection/disconnection of a remote device. It should be understood that in common parlance, a bridge has one portal and at least one co-portal.

SUMMARY

The approach of the disclosed method and apparatus makes bus bridges transparent for normal 1394 devices on the network that are not bridge-aware by translating all node addresses that are physically located on different buses into a set of unique addresses that identify a logically single IEEE1394 bus (1394). The approach works with bridge-aware nodes and non-bridge aware nodes. The advantage here is that it supports both existing and future bridge-aware devices. With this embodiment of the disclosed method and apparatus, the total number of all nodes on the whole network is limited to 63 including the bridges, which is the limit of the node address range of a conventional 1394 bus. This limit is not a problem for most typical applications.

The disclosed method and apparatus employs a new sequence of performing the bus configuration process (including bus reset, tree identify, self identify), after which each 1394 node see a single network, consisting of up to 63 nodes. The 1394 portal of a bridge is equivalent to a repeater node with only the physical layer (PHY) active, seen from regular 1394 nodes.

FIG. 1 illustrates a physical connection of bridged buses, showing a typical 1394 network bridged with another medium. The second "backbone" bus can be selected from a number of bus candidates different from the first bus. One bus suitable for use is a bus that employs coaxial cable wiring in an OFDM based network. An example of such an OFDM based network that may presently be constructed is that constructed in accordance with the well known "c.LINK® network standard. (c.LINK® is a registered trademark of Entropic Communications, Inc. of San Diego, Calif.) However, although an OFDM based network bus is described, any second bus can be used to bridge 1394 data that meets the bandwidth requirements of the application and can encapsulate the 1394 data for transport between 1394 network branches with prescribed parameters for latency.

The second bus can be called a backbone bus, an infrastructure bus, or a distribution system bus. In P1394.1, the term BUS SEGMENT NUMBER is used to refer to a bus that is bridged to another bus.

FIG. 2 shows the equivalent single flat IEEE1394 network after topology identification process according to the disclosed method and apparatus. Each 1394 node is seen by other nodes as a node address in a single 1394 network. The operation of bridging data from one 1394 network branch to another is transparent to the IEEE1394 nodes. Additionally, if the support of isochronous 1394 traffic is needed, the second bus also needs to have isochronous capability.

DETAILED DESCRIPTION

Figure 1:
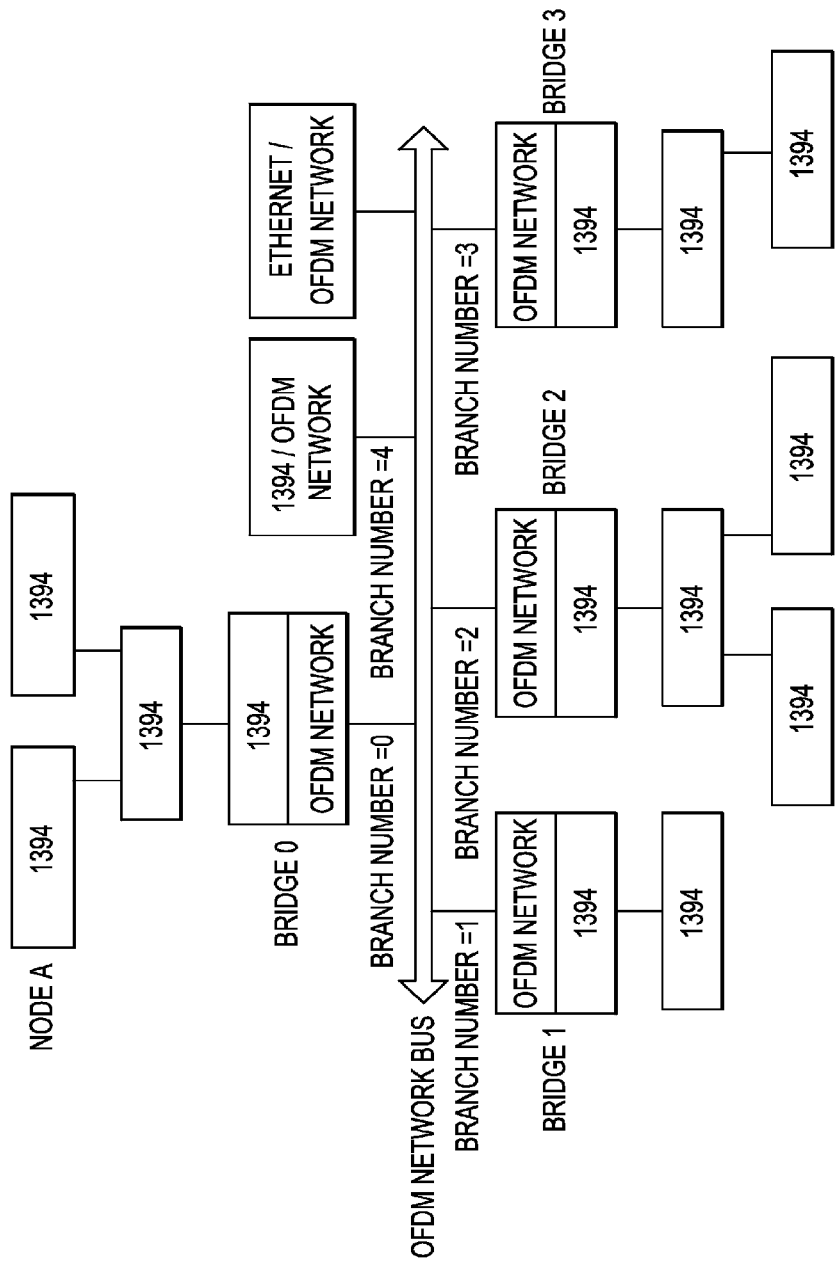
FIG. 1 shows the physical network topology and connection of bridged buses.
Figure 2:
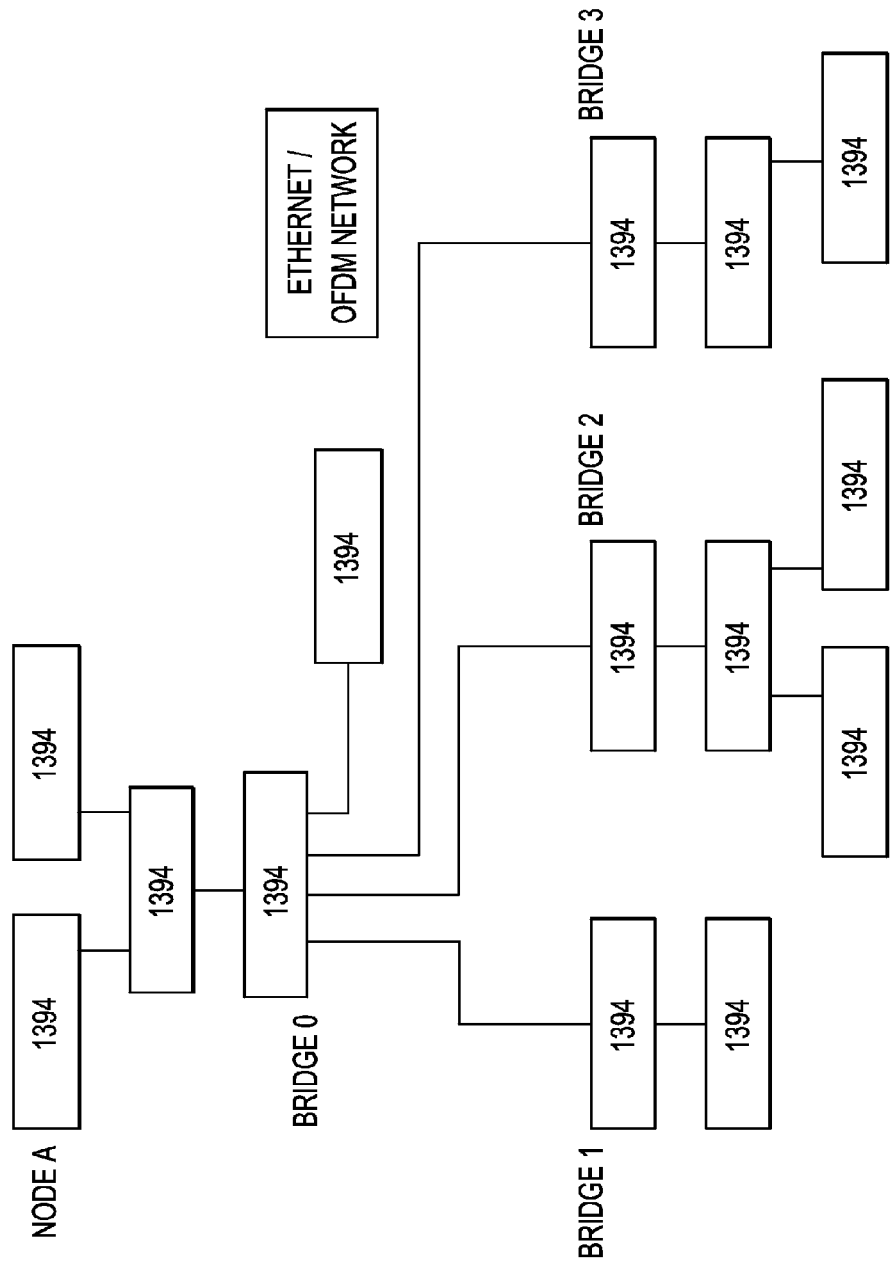
FIG. 2 shows the logical structure of the bridged buses after bus configuration according to the disclosed method and apparatus.

The disclosed method and apparatus is described using a backbone bus and in particular, a bus over coax cable as an example; one such suitable bus that can be used to bridge data between IEEE 1394 network branches uses the well known c.LINK network protocol. The following is the sequence of states and events used for topology identification flow:
1. backbone stand alone, no backbone bus node is connected.
2. First bridge is connected to the backbone bus. It becomes the Backbone Cycle Master (BCM), and has backbone bus node number 0. When other bridges are connected, they are assigned appropriate backbone bus node numbers, like 1, 2, 3 etc. The backbone bus node number is also the branch number, B(n), of the corresponding branch. A native backbone bus node running a 1394 stack is also a 1394 branch. Thus, a plurality of network branches exist. Each network branch has a root node and a plurality of branch nodes. Each root node and the branch nodes have respective physical node addresses A native backbone bus node running Ethernet or MPEG is not considered as a 1394 branch, and is ignored for 1394 topology identification.
3. BCM requests all bridges to reset its corresponding branch, which will trigger the following process for each branch:
   Reset
   Tree-identification: the 1394 portal of the bridge is set to wait the longest and to become the root of the branch.
   When tree-id process is finished, the branch root PRY automatically starts and controls the self-id process, during which all nodes on the branch transmit their self-id packets. The branch root is the last node to transmit its own self-id packet. The branch root collects all the self-id packets, and knows how many nodes are on the branch because its own self-id contains the value.
   Let NB be the number of branches in the network. Each branch has a unique branch number i ranging from 0 to NB−1. Let NN(i) be the number of nodes on branch i. The total number of IEEE1394 nodes is the sum of NN(i) for i=0 to NB−1, and is noted as TNN.
4. Each bridge sends its collection of local self-id packets to the BCM. BCM builds up a database of self-id packets including all nodes in the network. BCM then sends this database to all bridges.
5. Each bridge translates the physical id of a remote node into a unique virtual local node id. The virtual local node id is meaningful and useful for the local nodes that consider these remote nodes as logically local upon receiving and decoding the self-id packets containing the virtual local id. The legacy IEEE1394 has only awareness of physical node id, not virtual local node id. The local nodes see each other directly through their respective physical ids, and do not need a separate virtual local node id. Remote node ids are assigned numbers above local node physical ids. After the local id to virtual local id translation, all the nodes have their ids numbered from 0 to TNN−1. A phantom node is then added which has a virtual local node id of TNN.
6. The phantom node functionally consists of two parts: the local part acting locally as cycle master and bus manager of its branch, and global part acting globally as isochronous resource manager (IRM) and root of the overall flat 1394 network. Physically, the local part is embodied in the 1394 portal of the bridge; the global part is embodied in the 1394 co-portal of the BCM. We assume BCM is always the backbone co-portal of a bridge for simplicity. The phantom node generates cycle start packet for its branch. A 1394 node issues a request for bandwidth or channel to the IRM (using a lock request message), which may be on the local branch or on a remote branch.
7. When the self-id translation in step 5 is finished, each bridge will initiate a new bus configuration process (bus reset, tree identify, self identify), but this time, the self identify process is modified by the branch root which transmits the translated self-id packets from remote nodes (which are also the virtual local nodes), after sending its own self-id packet. The switching from the end of the bridge's self-id packet to the sending of the translated self-id packets for the remote nodes is possible because of well-defined PRY interface and its interaction with the link layer at the transition time from the bus configuration process to the normal arbitration process. Local nodes see a virtual image of the remote nodes thanks to the translated self-id packets of the remote nodes. The translated self-id packets from remote nodes are sent in a well-defined order, so that each local node will receive them and thus can deduct a flat topology from all self-id packets received. After the branch root has sent all the translated self-id packets, it will drive idle to the bus so that after a well-specified time gap, all nodes will be enabled to start arbitration for normal operation.

8. The overall net root is the phantom node located on branch 0. It is embodied in the 1394 co-portal of bridge 0. Each 1394 co-portal is designed to be Isochronous Resource Manager capable, so that the overall root (the phantom node) is also the IRM.

9. Before the end of step 7, there can be topology change:
   One or several bridges are connected or disconnected: this is detected by BCM;
   One or several 1394 nodes are connected or disconnected: this is detected by the branch root, which in turn informs BCM.

Then the steps 3 to 7 are done again.

The result is that within a 1394 branch network, for each local physical node, its virtual local id as contained in its self-id packet is identical to its real physical id. Real physical ids always start from 0 and increment by 1 up to the total number of local nodes minus 1. For each remote node, the 1394 bridge portal of the bridge is its proxy, and its virtual local node id is contained in the self-id packet generated by the bridge portal in the name of the remote device. The virtual local node id starts at (total number of local nodes) and increments by 1.

The bridging medium can be wired or wireless, like 802.11a/b/g, Hiperlan, Ethernet, or a backbone bus. The requirements on this bridging medium is that
   it has a maximum latency smaller than the SPLIT_TIMEOUT value in the 1394 nodes (typically 100 ms).
   If the 1394 nodes want to use isochronous channels, the medium must also support isochronous channels, as the Hiperlan (High Performance Radio LAN) standard does or something equivalent to isochronous channels with the help of appropriately sized data buffers, and provide a mechanism so that all isochronous packets for a given channel has a constant delay over the medium. The medium may also need to update the timestamp in the original 1394 packets to account for the extra constant time delay introduced by the medium network.
   Enough bandwidth needed for two 1394 nodes separated by bridges.

Traffic Routing over Bridges 1394 data transactions consist of asynchronous packets and isochronous packets. The two types of packets are routed using different mechanisms.

Asynchronous Packet Routing

Each branch-root keeps a global topology map, composed of branches. Since each asynchronous packet has a destination_ID, when the branch-root receives a packet from its local bus, it first checks the local/remote parameter in the topology map to see if the packet is for a local node or for a remote node, by looking at the destination_ID. If the destination_ID is a local node, then the branch-root discards the packet, and waits for next packet. If it's for a remote node, then the branch-root finds out the branch ID of the destination node using the topology map; translates the virtual destination ID into local destination ID; forwards the packet and the branch ID to the OFDM network co-portal; the backbone co-portal then sends the packet over the backbone bus to another backbone co-portal at the exit bridge; the backbone co-portal of the exit bridge then forwards the packet to its 1394 co-portal; which then sends the packet to its local bus.

Isochronous Packet Routing

Each bridge proactively finds out what local 1394 isochronous channels it needs to pass through from the 1394 to the backbone domain, what backbone packets it needs to pass through from the C-portal to the 1394 portal, and accordingly sets up stream connection on its own, without needing a controller node. Each bridge can do this by assuming that all 1394 devices are compliant to IEC61883-1 for transporting isochronous stream. Such devices use IEC61883-1 isochronous data flow management registers oMPR, oPCR, iMPR, iPCR.

At the end of the bus configuration process (reset; tree identify; self identify), each branch-root reads (oMPR, oPCR, iMPR, iPCR) registers of all nodes on all branches. Afterwards, each branch-root snoops backbone-crossing asynchronous packets at offset of registers (oMPR, oPCR, iMPR, iPCR), to monitor any change, for example addition or removal of stream connections.

For each listening plug (iPCR), find out if there is a corresponding talking plug (oPCR) on the branch.
   If yes: then local isoch traffic.
   If no: then talker is on a remote branch, and the C portal will pass all isoch packet with that channel number.
For each talking plug (oPCR), find out all the corresponding remote listening plug (iPCR)
   If there is no remote listening plug, the isoch packet with this channel will remain local.
   If there is one remote listening plug, the C portal will forward all packets of this channel to the corresponding remote C portal, using point-to-point connection.
   If there are more than one remote listening plugs, the C portal will forward all packets of this channel to all corresponding remote C portals, using multicast connection, with GCD for the listening nodes only, not all nodes.

Time Synchronization

For each bridge, the backbone portal and its 1394 co-portal use the same clock. The virtual 1394 cycle master is located on every 1394 co-portal, which is also the branch root. All 1394 nodes on a given branch are synchronized to the virtual cycle master.

Figure 3:
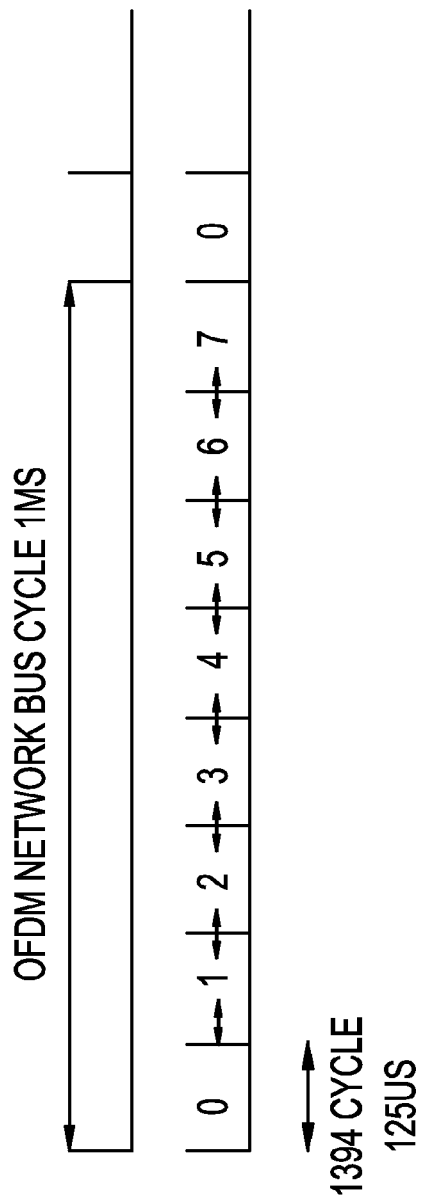
FIG. 3 shows the relationship between cycles of two dissimilar buses and more particularly a backbone bus cycle relationship to 1394 bus cycles.

FIG. 3 shows the relationship between a backbone cycle and 1394 cycles. In a standard 1394 bus, the cycle start packet may be pushed out if an asynchronous packet is in transmission at the end of the nominal cycle. To guarantee a normal streaming between two 1394 nodes across the backbone, the virtual cycle master needs to guarantee the phase synchronization, by holding the bus at the end of the 1394 cycle 7. Holding the bus is a low level signaling used in a 1394 bus. One node can hold the bus by driving a special signaling to the bus, using high bus arbitration priority to take over the bus and keep it so that other nodes cannot transmit.

In an alternative embodiment, the PHY layer is modified and the method of translation is according to the following sequence:
1. backbone coax cable stand alone, no C-node backbone bus node is connected.
2. First bridge is connected to the backbone. It becomes the backbone Cycle Master, and has backbone bus node number 0. When other bridges are connected, they are assigned appropriate backbone bus node numbers, like 1,2,3 etc. The backbone bus node number is also the branch number, B(n), of the corresponding branch.
3. BCM requests bridge 1 to reset its corresponding branch, which will trigger the bus configuration process of the branch. At the end of the process, the branch root collects all the self-id packets, and knows how many nodes are on the branch because its own self-id contains the value.
4. Bridge 1 sends its collection of local self-id packets to bridge 2. Bridge 2 builds up a database of self-id packets received so far from all remote nodes in the network.
5. BCM requests bridge 2 to reset its corresponding branch, which will trigger the bus configuration process of the branch. The 1394 portal of the bridge is set to wait the longest and to become the root of the branch. When tree-id process is finished, the PRY of the branch root indicates this to the link layer, and the link layer first sends out the self-id packets accumulated in its database, so that all local nodes will see them, and increments their respective self_ID_count. Then the branch root starts and controls the self-id process for the nodes on this branch, during which all nodes on the branch transmit their self-id packets. The branch root is the last node to transmit its own self-id packet.
6. Bridge 2 sends its collection of both remote and local self-id packets to bridge 3.
7. Repeat steps 5 and 6 for each bridge, until all branches are done, the branch 0 being the last.
8. BCM sends its accumulated self-id database to all other branch roots, and each branch root re-transmits self-id packets from branches with higher branch numbers than itself and additionally branch 0 self-id. When this is done, each node in the net will have seen the self-id packets of all other nodes, and logically all nodes are on the same single 1394 bus.
9. If the net topology has changed during the above process, the whole process is started again.

What is claimed is:

1. A bus system, comprising:
a plurality of network branches, each having a root node and a plurality of branch nodes, each said root node and said branch nodes having respective physical node addresses and communicating in conformance with the first bus;
a backbone bus conforming to a second bus different from the first bus, said backbone bus having a bandwidth sufficient to encapsulate data for transport between said network branches;
bridge devices having connected to said backbone bus and to said network branches, said bridge devices connecting said root nodes to respective ones of said backbone bus nodes;
a phantom node operative to translate said physical node addresses to unique virtual node addresses to establish a virtual address database in each bridge device to enable communication among any of said branch nodes over said backbone bus.

2. The bus system of claim 1 wherein at least one of said network branches is IEEE1394 complaint.

3. The bus system of claim 2 wherein said plurality of network branches comprises 1023 IEEE1394 network branches.

4. The bus system of claim 1 wherein said bridge devices are located in respective branch nodes and corresponding locations of said backbone bus.

5. The bus system of claim 1 wherein said backbone bus has an isochronous capability to support isochronous 1394 traffic.

6. The bus system of claim 1 wherein said bridging devices operate as root nodes of said network branches.

7. The bus system of claim 1 wherein said backbone bus is capable of supporting adequate bandwidth to bridge via encapsulation the IEEE 1394 traffic which is transferred transparently with prescribed latency parameters.

8. The bus system of claim 1 wherein each said local and branch nodes have a self-id address for providing said physical node addresses.

9. A network comprising:
a first sub-network having a plurality of local nodes, each local node of the plurality of local nodes having a virtual local address;
a second sub-network having a plurality of remote nodes, each local node of the plurality of local nodes having a remote address;
a plurality of bridge devices, wherein each bridge device of the plurality of bridge devices associates the remote nodes with the virtual local node by mapping the remote address to the virtual local address to enable communication between nodes.

10. The network of claim 9 wherein at least said second sub-network is IEEE1394 complaint.

11. The network of claim 9 further comprising a plurality of said second sub-networks.

12. The network of claim 11 wherein said plurality of second sub-networks comprises 1023 IEEE1394 compliant sub-networks.

13. The network of claim 12 wherein said backbone bus is capable of supporting adequate bandwidth to bridge via encapsulation the IEEE 1394 traffic which is transferred transparently with prescribed latency parameters.

14. The network of claim 9, said first sub-network comprising a backbone bus of a type different from said first sub-network and to which said plurality of bridge devices interface.

15. The network of claim 14 wherein said backbone bus nodes have the ability to communicate isochronously with other nodes present in the first sub-network.

16. The network of claim 9 further comprising a phantom node having a global part in a co-portal of said first sub-network, said phantom node containing a map of the remote address to virtual local address.

17. The network of claim 9 wherein said bridge devices are located in respective second sub-network and corresponding locations of said first sub-network.

18. The network of claim 17 wherein said bridge devices operate as root nodes of said second sub-network.

19. A network bridging arrangement, comprising:
a first sub-network having a plurality of local nodes, each local node having a unique assigned local address;
a second sub-network having a plurality of remote nodes, each remote node having an assigned remote node address;
a first bridge device having a list of the remote node addresses;
wherein the assigned local addresses are distinct from all of the remote node addresses; and
a second bridge device having the list of the remote node addresses and the unique local node addresses, whereby within each sub-network the local nodes and the remote nodes are identified with unique addresses to enable communication between the local nodes and the remote nodes through the bridge devices.

20. The network bridging arrangement of claim 19 wherein at least said second sub-network is IEEE1394 complaint.

21. The network bridging arrangement of claim 19 further comprising a plurality of second sub-networks.

22. The network bridging arrangement of claim 21 wherein said plurality of second sub-networks comprises up to 1023 of said second sub-networks.

23. The network bridging arrangement of claim 19 wherein said first sub-network comprises a backbone bus of any type that meets the bandwidth to bridge via encapsulation of the IEEE 1394 traffic which is transferred transparently within prescribed latency parameters.

24. The network bridging arrangement of claim 23 wherein said backbone bus has an isochronous capability.

25. The network bridging arrangement of claim 23 wherein said backbone bus is capable of supporting adequate bandwidth to bridge via encapsulation the IEEE 1394 traffic which is transferred transparently with prescribed latency parameters.

26. The network bridging arrangement of claim 23 wherein said second sub-network has a plurality of branch nodes each having a physical node address, and further comprising a phantom node having a global part in a corresponding co-portal of said backbone bus, said phantom node operative to translate physical node addresses of the branch nodes to unique virtual node addresses and to establish a virtual address database to enable communication among any of said branch nodes.

27. The network bridging arrangement of claim 19 wherein said first and second bridge devices operate as root nodes of said first and second sub-networks.

\* \* \* \* \*